(12) United States Patent
Ikuta et al.

(10) Patent No.: US 6,643,251 B1
(45) Date of Patent: Nov. 4, 2003

(54) DISC DRIVE APPARATUS

(75) Inventors: Hiroshi Ikuta, Chiba (JP); Kentaro Soeda, Tokyo (JP); Mitsuhiro Ueno, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/521,327

(22) Filed: Mar. 8, 2000

(30) Foreign Application Priority Data

Mar. 9, 1999 (JP) .......................................... 11-061512

(51) Int. Cl.$^7$ ............................................... G11B 33/14
(52) U.S. Cl. ..................................................... 369/263
(58) Field of Search ................................. 369/263, 258, 369/176; 360/97.01, 97.02, 97.03, 99.08

(56) References Cited

U.S. PATENT DOCUMENTS

| | | | |
|---|---|---|---|
| 5,453,890 A | * 9/1995 | Takegami et al. | 360/97.02 |
| 5,898,537 A | * 4/1999 | Oizumi et al. | 360/97.01 |
| 6,038,205 A | * 3/2000 | Katakura et al. | 360/99.08 |
| 6,236,532 B1 | * 5/2001 | Yanagisawa | 360/97.02 |
| 6,407,879 B1 | * 6/2002 | Fruge' et al. | 360/97.02 |

\* cited by examiner

*Primary Examiner*—A. J. Heinz
*Assistant Examiner*—Angel Castro
(74) *Attorney, Agent, or Firm*—Frommer Lawrence & Haug LLP; William S. Frommer; Matthew K. Ryan (57) ABSTRACT

A disc drive apparatus performing recording and/or reproduction on a disc-shaped recording medium in which the top plate of a body is in close proximity to the disc-shaped recording medium and the top plate is provided with air passages that extend in radial directions of the disc-shaped recording medium. This disc drive apparatus prevents floatation of the disc-shaped recording medium without causing cost increase.

8 Claims, 13 Drawing Sheets

20 ... TOP PLATE
22 ... PUNCH-OUT PORTION
23 ... OUTER COVER
24 ... INNER COVER

Fig. 1

1 ... DISC DRIVE APPARATUS
2 ... BODY
16 ... DISC-SHAPED RECORDING MEDIUM
20 ... TOP PLATE
21 ... AIR PASSAGE
22 ... PUNCH-OUT PORTION
23 ... OUTER COVER
24 ... INNER COVER

20 ... TOP PLATE
22 ... PUNCH-OUT PORTION
23 ... OUTER COVER
24 ... INNER COVER

Fig. 4

1A ... DISC DRIVE APPARATUS
2A ... BODY
16 ... DISC-SHAPED RECORDING MEDIUM
20A ... TOP PLATE
25 ... AIR PASSAGE
26 ... GROOVE
27 ... COVER

Fig. 6

20A ... TOP PLATE
26 ... GROOVE
27 ... COVER

Fig. 7

1B .... DISC DRIVE APPARATUS
2B .... BODY
16 .... DISC-SHAPED RECORDING MEDIUM
20B .... TOP PLATE
28 .... AIR PASSAGE
29 .... GROOVE FORMING MEMBER
30 .... GROOVE

Fig. 8

20B ... TOP PLATE

28 ... AIR PASSAGE

29 ... GROOVE FORMING MEMBER

30 ... GROOVE

Fig. 9

20B ... TOP PLATE

29 ... GROOVE FORMING MEMBER

30 ... GROOVE

20C ... TOP PLATE

32 ... TUBE-SHAPED MEMBER

Fig. 12

20C ... TOP PLATE

32 ... TUBE-SHAPED MEMBER

Fig. 13

20C ... TOP PLATE
32D ... TUBE-SHAPED MEMBER

DISC DRIVE APPARATUS

BACKGROUND OF THE INVENTION

A. Field of the Invention

The present invention relates to an improved disc drive apparatus. More specifically, the invention relates to a technique of preventing flotation of a disc-shaped recording medium in a disk drive apparatus.

B. Related Fields

In disc drive apparatuses, for example, replaceable disc drive apparatuses such as a CD-ROM drive, a sealed structure is provided above the disc-shaped recording medium as a countermeasure against the intrusion of dust thereinto. The portion below the disc-shaped recording medium is provided with a head for information reading, a spindle motor for rotating the disc-shaped recording medium, and other components.

When a disc-shaped recording medium is rotated at high speed, the air under the disc-shaped recording medium can circulate in such a manner as to flow to the outside of the disc-shaped recording medium and pass by the spindle motor. However, the air over the disc-shaped recording medium cannot circulate because even if it flows to the outside of the disc-shaped recording medium it cannot go further due to the relatively small size (height) of the space over the disc-shaped recording medium. Therefore, the air pressure in the sealed space over the disc-shaped recording medium becomes lower than that in the portion under the disc-shaped recording medium. As a result, the disc-shaped recording medium is disadvantageously sucked up (floated up) because of this air pressure difference.

To reduce cost, the spindle motor has used a sintered oil-retaining metal as a bearing. In addition, the spindle motor causes the rotor to be pressed downwardly only by an attraction force that is generated by utilizing a deviation between the magnetic center of a rotor magnet and that of the iron core of each stator coil.

In the disc drive apparatus having such an arrangement, with an increase in speed, it has become difficult to prevent flotation of the disc-shaped recording medium only by using the attractive force of the rotor magnet. As a consequence thereof, read errors occur more frequently.

Previous methods for preventing flotation of the disc-shaped recording medium include the use of another magnet (in addition to the rotor magnet) that is dedicated to retaining the rotor there below and the use of a ball bearing instead of a sintered oil-retaining metal bearing. However, in requiring an additional component, these methods have been found to be costly.

OBJECTS AND SUMMARY OF THE INVENTION

It is an object of this invention to provide a disk drive apparatus which avoids the above-noted deficiencies of the prior art.

It is also an object of this invention to provide a disk drive apparatus which reduces read errors.

It is a further object of this invention to provide a disk drive apparatus which prevents disc-shaped recording medium from floating at high speed which does not require additional components, such as another magnet (in addition to the rotor magnet) or the use of a ball bearing.

It is a further object of this invention to provide a disc drive apparatus which prevents flotation of a disc-shaped recording medium without causing cost increase.

To solve the above problems, in a disc drive apparatus according to the invention, a top plate includes air passages that extend in radial directions of a disc-shaped recording medium.

Therefore, in the disc drive apparatus according to the invention, air that has passed from a central portion to a peripheral portion due to rotation of the disc-shaped recording medium returns to the central portion via the air passages of the top plate so that reduction in air pressure is prevented over the disc-shaped recording medium. As a result, flotation of the disc-shaped recording medium can be prevented without the need for using an expensive additional component.

The above, and other objects, features and advantages of the present invention, will become apparent in the following detailed description of preferred embodiments which are to be read in conjunction with the accompanying drawings, and in which like numerals are used to identify the same or similar parts in the several views.

BRIEF DESCRIPTION OF THE DRAWINGS

The following detailed description given by way of example, but not intended to limit the invention solely to the specific embodiments described, may best be understood in conjunction with the accompanying drawings in which.

DETAILED DESCRIPTION OF CERTAIN PREFERRED EMBODIMENTS OF THE INVENTION

Figure 1:
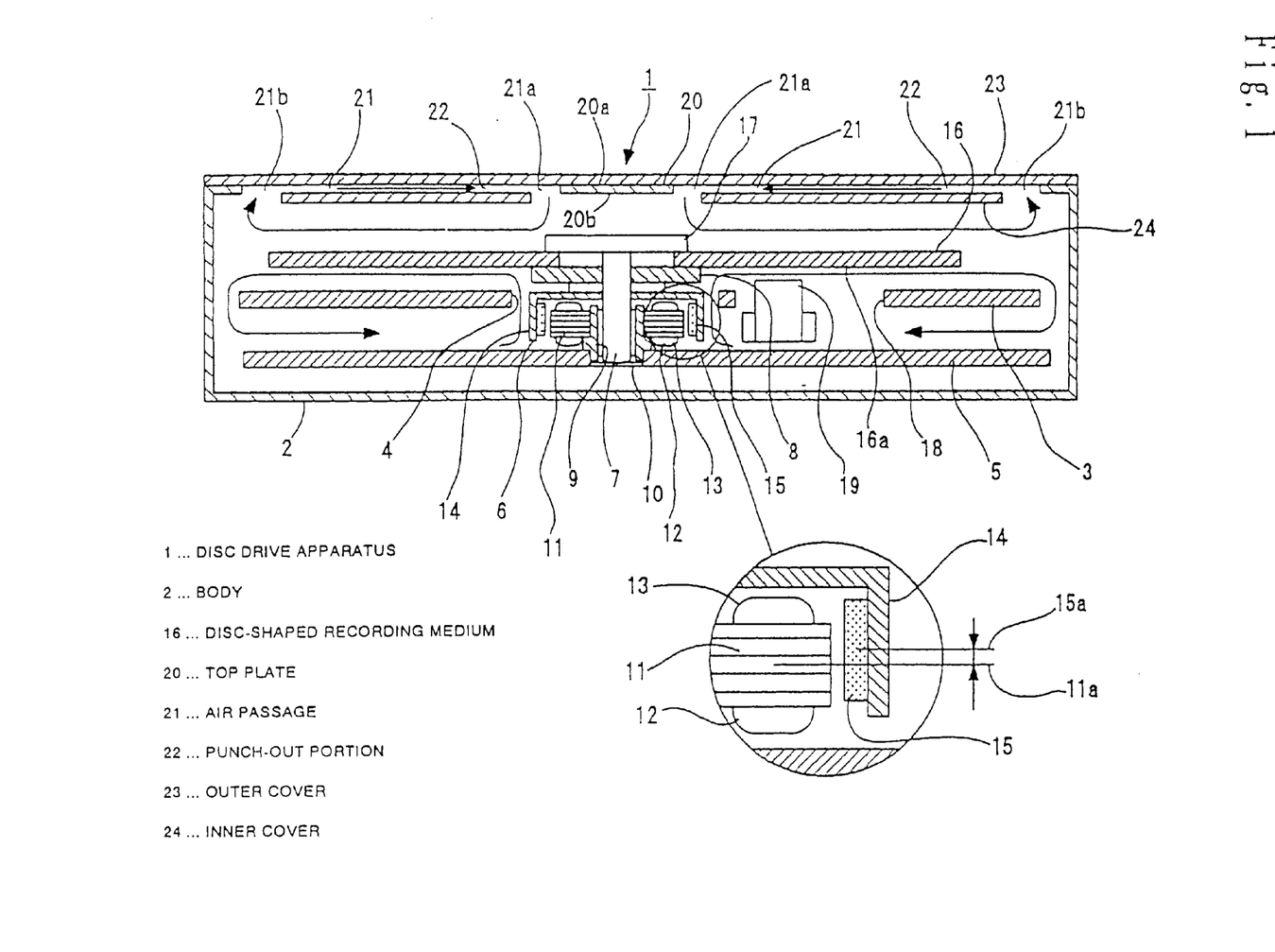
FIG. 1 is a vertical sectional view illustrating a preferred embodiment of a disc drive apparatus in accordance with the teachings of the present invention.
Figure 2:
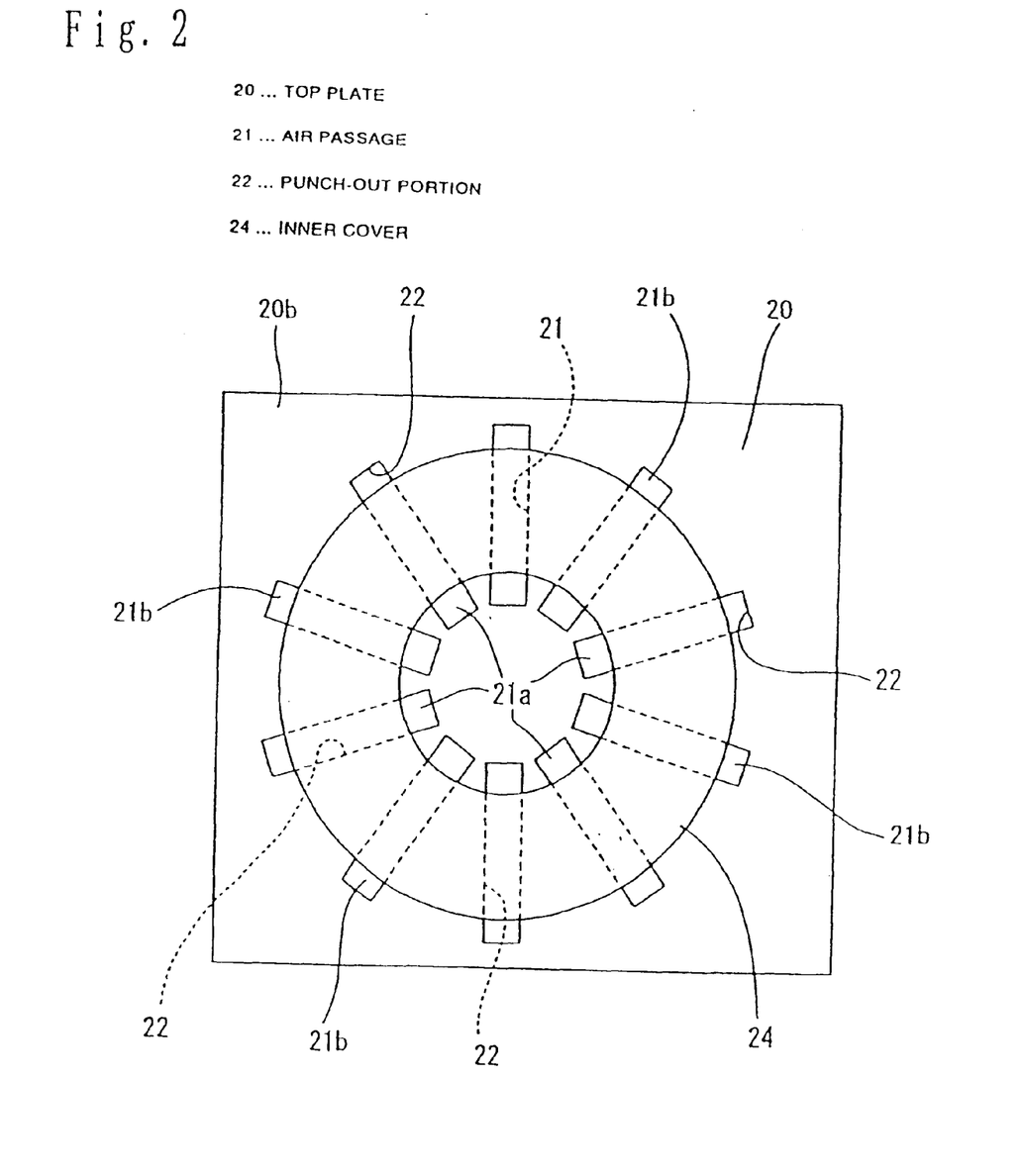
FIG. 2 is a bottom view of a top plate of the disc drive apparatus of FIG. 1.
Figure 3:
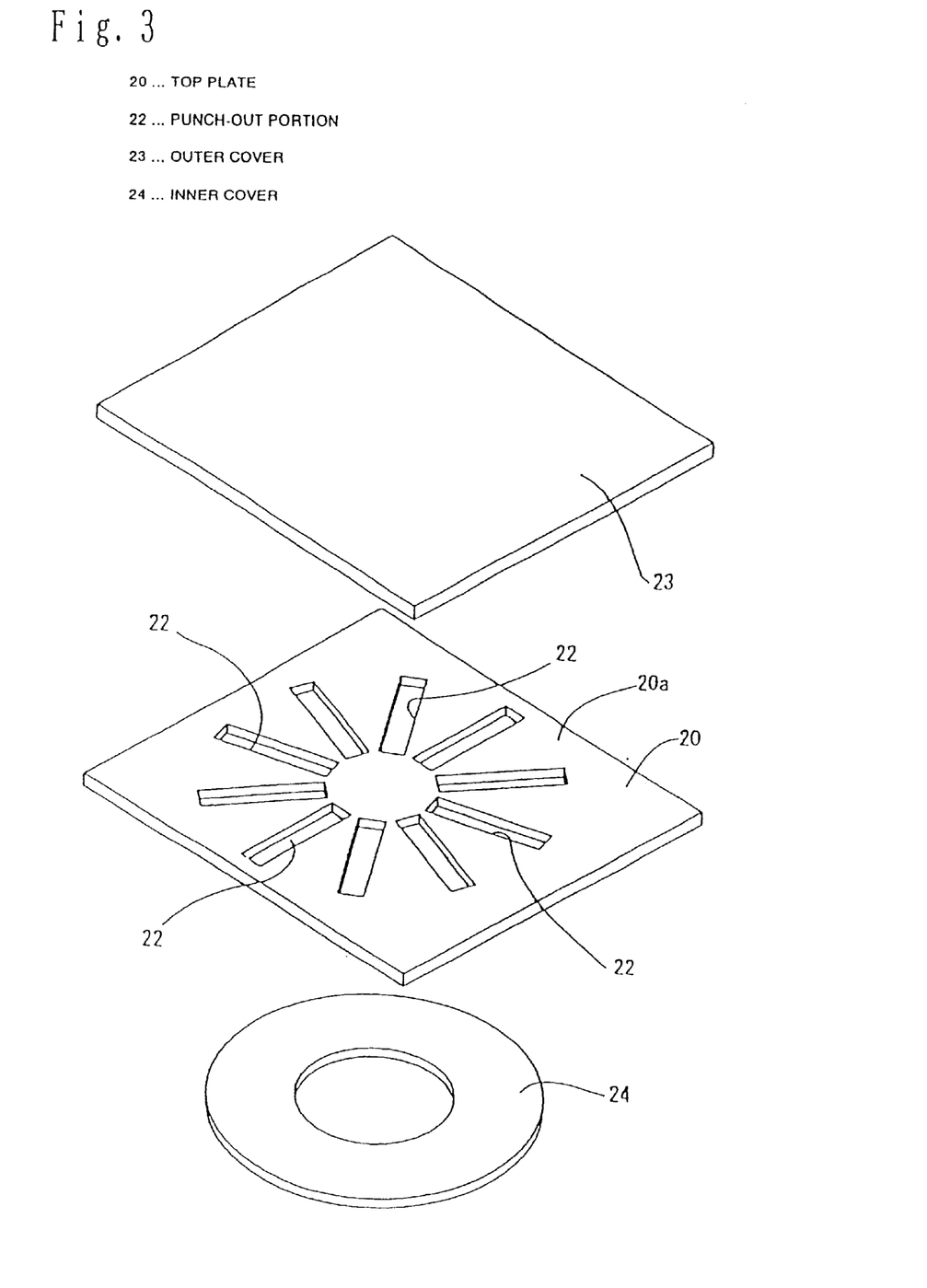
FIG. 3 is an exploded perspective view of the top plate of the disc drive apparatus of FIG. 1

Referring now to FIGS. 1–3, a disc drive apparatus in accordance with a first embodiment of the present invention is illustrated. As shown therein, mechanics chassis 3 having an opening 4 is provided in a body 2 of the disc drive apparatus 1. A disc table 8 is fixed to a rotary shaft 7 of a spindle motor 6. This spindle motor 6 is supported by a motor circuit board 5 which projects above the mechanics chassis 3 through the opening 4.

A metal bearing 9 made of a sintered oil-retaining metal is fixed to the motor circuit board 5. Approximately the lower half of the rotary shaft 7 is inserted in and supported by the metal bearing 9. A thrust bearing 10 is provided under the metal bearing 9, and the lower end of the rotary shaft 7 is supported by the thrust bearing 10.

Stator coils 13 are secured to the motor circuit board 5. These stator coils 13 include a coil wire 12 which is wound on iron cores 11 that are provided around the metal bearing 9.

A rotor 14 is fixed to the rotary shaft 7. A rotor magnet 15 is secured to the rotor 14 so as to be opposed to the stator coils 13 (see FIG. 1). The magnetic center 11a of each iron core 11 is deviated from, that is, located under, the magnetic center 15a of the rotor magnet 15. With this arrangement, the attractive force of the rotor magnet 15 serves to move the rotor 14 downwardly, whereby the lower end of the rotary shaft 7 is received by the thrust bearing 10.

The central portion of a disc-shaped recording medium 16 is mounted on the disc table 8 and chucked by a chucking member 17. In this state, the disc-shaped recording medium 16 is rotated as the spindle motor 6 rotates.

The mechanical chassis 3 is formed with an access hole 18 that extends in a radial direction of the disc-shaped recording medium 16 from a position close to the center thereof. A head 19 for reading the information recorded on the disc-shaped recording medium 16 is mounted on the disc table 8. The head 19 faces the information recording surface 16a of the disc-shaped recording medium 16 via the access hole 18 and moves in the radial direction of the disc-shaped recording medium 16.

A top plate 20 of the body 2 is formed with a plurality of air passages 21 that extend in radial directions of the disc-shaped recording medium 16 from positions corresponding to the central portion of the disc-shaped recording medium 16 to positions corresponding to a outer portion along its outside periphery. The inner openings 21 a of the respective air passages 21 are open to the central portion of the disc-shaped recording medium 16 and the outer openings 21b are open to the outer portion along the outside periphery of the disc-shaped recording medium 16.

The above-described air passages 21 are formed in the following manner.

First, punch-out portions 22 that extend from inside end positions corresponding to the central portion of the disc-shaped recording medium 16 to outside end positions extending from its outside periphery are formed in the top plate 20. Then, a sheet-like outer cover 23 for entirely covering the punch-out portions 22 is bonded to the top surface 20a of the top plate 20 (see FIG. 3). Further, a sheet-like, doughnut-shaped inner cover 24 for covering the portions of the respective punch-out portions 22 except their inner end portions and outer end portions is bonded to the inside surface 20b of the top plate 20. As a result, the punch-out portions 22 are covered with the covers 23 and 24 from above and below, respectively, to form the air passages 21, and the inner end portions and the outer end portions of the respective punch-out portions 22 that are not covered with the inner cover 24 from below become the inner openings 21 a and the outer openings 21b, respectively.

Thus, in the above-described disc drive apparatus 1, under the disc-shaped recording medium 16, part of the air that has moved to the outside of the rotating disc-shaped recording medium 16 passes under the mechanics chassis 3 as in the conventional case and returns to the portion over the mechanics chassis 3 via the central opening 4 (indicated by arrows in FIG. 1). Over the disc-shaped recording medium 16, the other part of the air passes into the air passages 21 through their outer openings 21b, passes through the air passages 21, and returns from the inner openings 21 to the portion under the air passages 21.

Therefore, in contrast to the conventional case, the phenomenon that the air pressure becomes extremely low over the disc-shaped recording medium 16 does not occur. As a result, flotation of the disc-shaped recording medium 16 is prevented without the requirement of a magnet to retain the rotor 14 therebelow or using a ball bearing as the bearing. Therefore, even if the rotation speed of the disc-shaped recording medium 16 increases with an increase in the speed of reading the information on the disc-shaped recording medium 16, information reading errors due to flotation of the disc-shaped recording medium 16 can be prevented.

Further, in the disc drive apparatus 1 according to this embodiment, since the outer and inner covers 23 and 24 can be very thin, the air passages 21 can be formed approximately within the thickness of the top plate 20. In particular, where various warning labels etc. need to be provided on the top surface of the top plate 20, a sheet on which such warning labels etc. are written may also serve as the outer cover 23.

Each of the outer and inner covers 23 and 24 which cover all or parts of the punch-out portions 22 can be a single cover. Alternatively, each of the outer and inner covers 23 and 24 can cover the respective punch-out portions 22 or each cover a plurality of punch-out portions 22.

Figure 4:
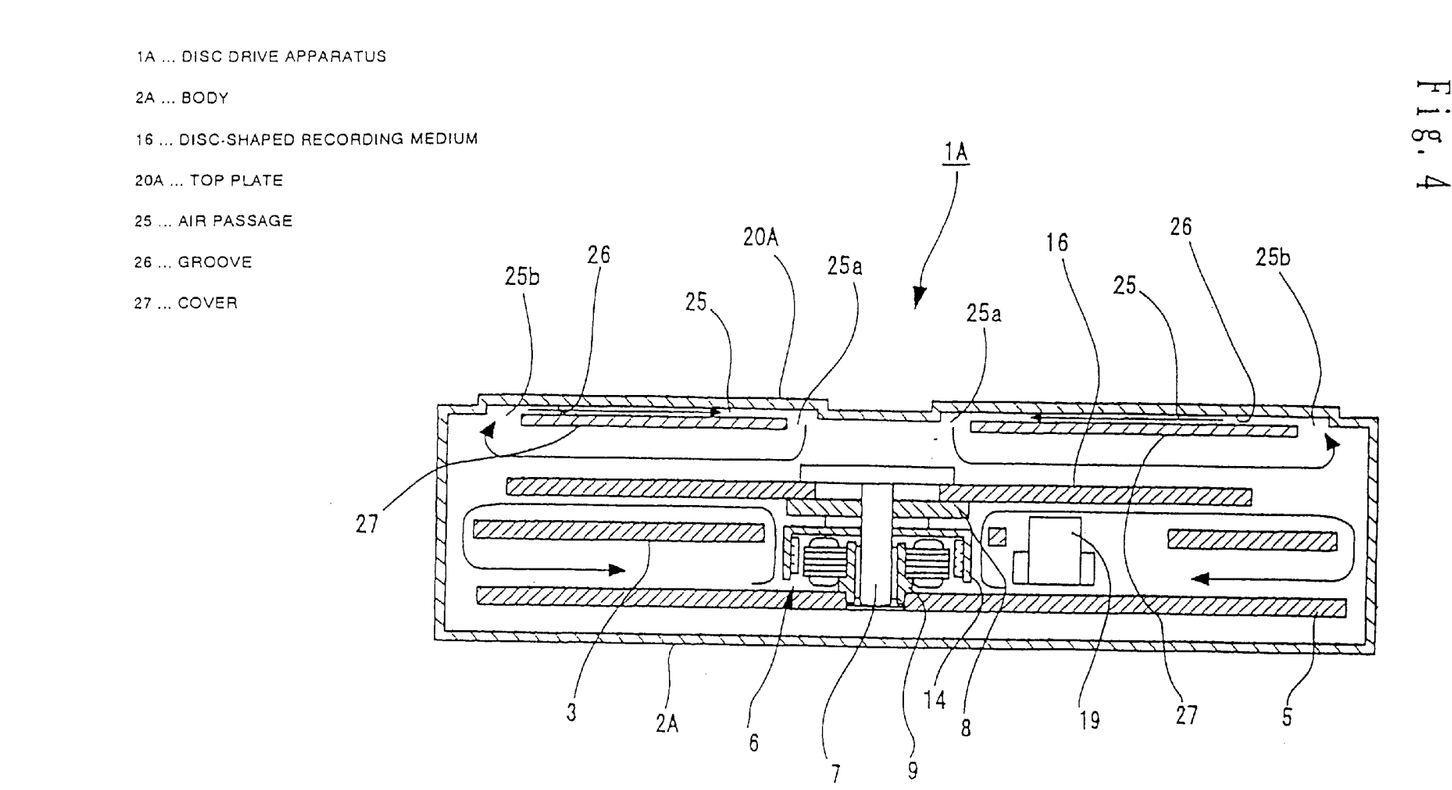
FIG. 4 is a vertical sectional view showing a second preferred embodiment of a disc drive apparatus in accordance with the teachings of the present invention.
Figure 5:
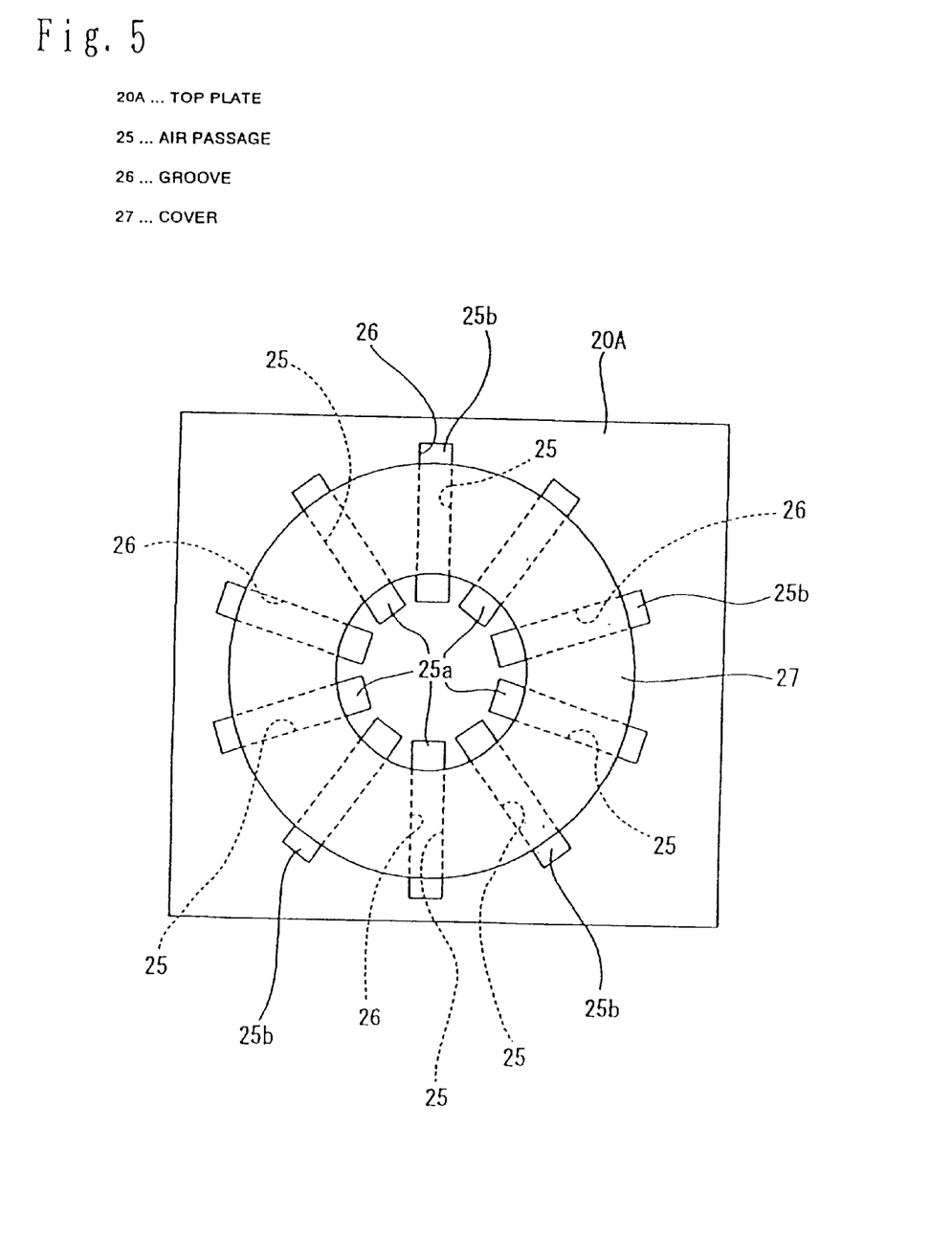
FIG. 5 is a bottom view of a top plate of the disc drive apparatus of FIG. 4.
Figure 6:
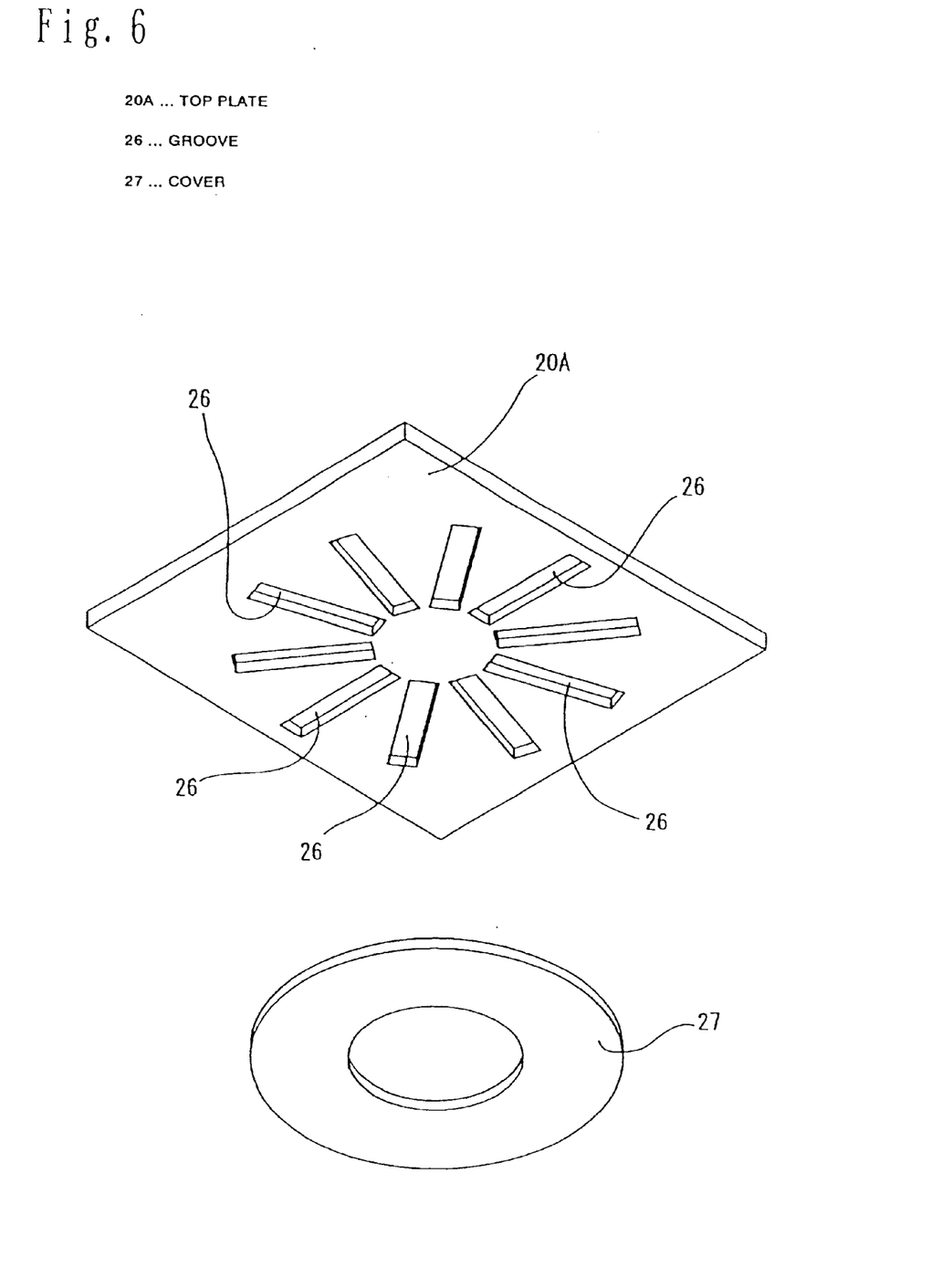
FIG. 6 is a perspective view in which the top plate and a cover of the disc drive apparatus of FIG. 4 are separated.

FIGS. 4–6 show a disc drive apparatus according to a second embodiment of the present invention. As shown therein, the disc drive apparatus IA according to the second embodiment is the same as the above-described disc drive apparatus 1 according to the first embodiment except for the arrangement of the air passages. Therefore, only the different elements will be described below in detail and the same element will have the same reference symbols as in the first embodiment. This also applies to following third and fourth embodiments.

The inside surface of the top plate 20A of the body 2A is formed with a plurality of air passages 25 that extend in radial directions of a disc-shaped recording medium 16 that is mounted on the disc table 8 from the central portion of the disc-shaped recording medium 16 to an outside portion along its outside periphery. The inner openings 25a of the respective air passages 25 are open to the central portion of the disc-shaped recording medium 16 and the outer openings 25b are open to the outer portion along its outside periphery.

The above-described air passages 25 are formed in the manner shown in FIGS. 5 and 6 as follows.

First, the inside surface of the top plate 20A is formed with grooves 26 that extend from a central portion of a disc-shaped recording medium 16 that is mounted on the disc table 8 to the outer portion along its outside periphery. Then, a sheet-like, doughnut-shaped cover 27 for covering the portions of the respective grooves 26 except their inner end portions and outer end portions is bonded to the inside surface of the top plate 20A. As a result, the grooves 26 are covered with the cover 27 from below to form the air passages 25, and the inner end portions and the outer end portions of the respective grooves 26 that are not covered with the cover 27 from below form the inner openings 25a and outer openings 25b, respectively.

Also in the disc drive apparatus 2A according to the second embodiment, as the disc-shaped recording medium 16 rotates air flows thereover so as to circulate via the air passages 25, whereby the phenomenon of extremely high negative pressure occurring over the disc-shaped recording medium 16 is prevented. Moreover, since the inside surface of the top plate 20A is formed with the grooves 26 to form the air passages 25 in the second embodiment, the top plate 20A is reinforced.

Although cover 27 that partially covers the grooves 26 from below is a single cover, it may cover the respective grooves 26 or cover a plurality of grooves.

Figure 7:
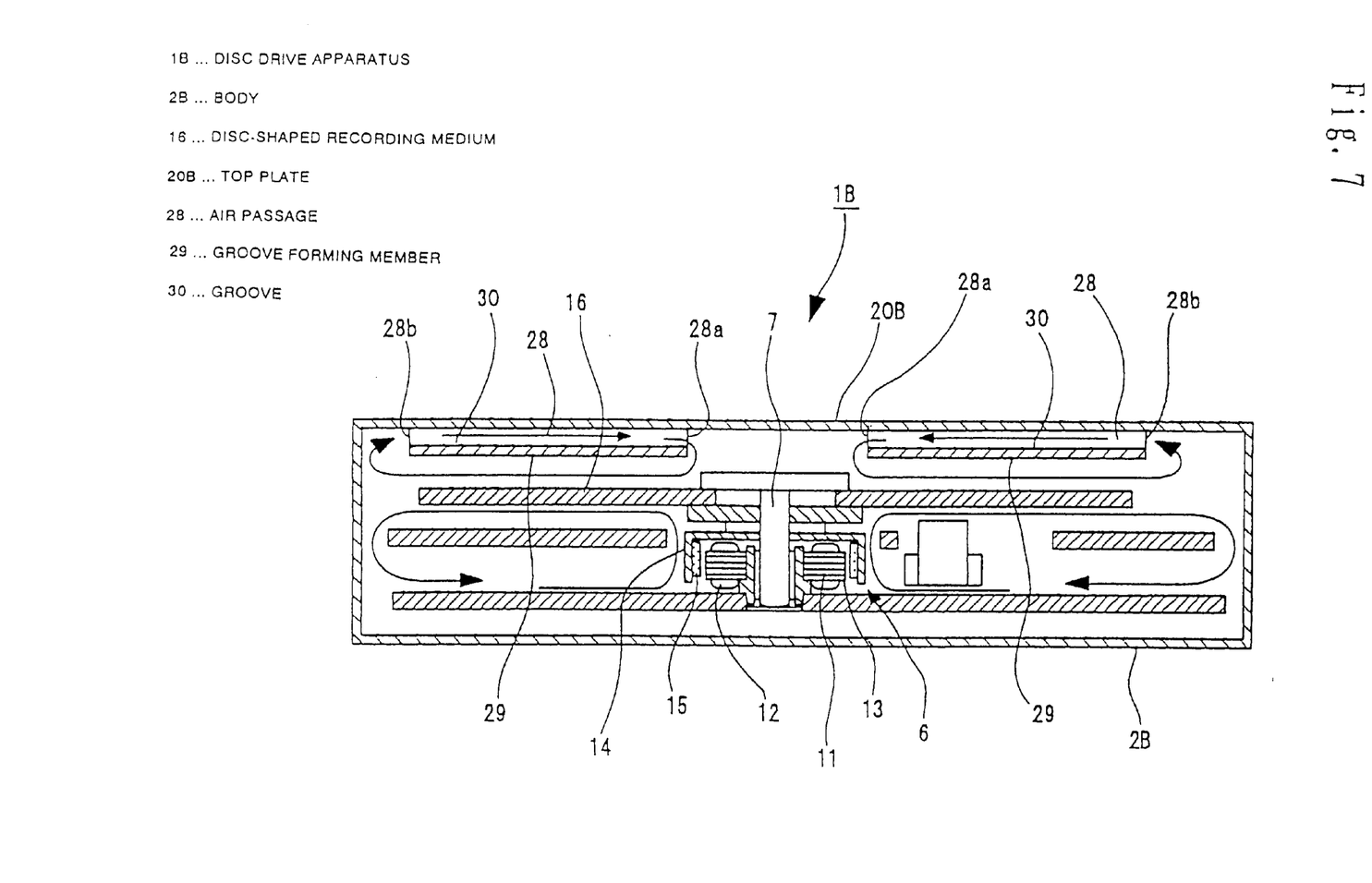
FIG. 7 is a vertical sectional view showing a third preferred embodiment of a disc drive apparatus in accordance with the teachings of the present invention.
Figure 8:
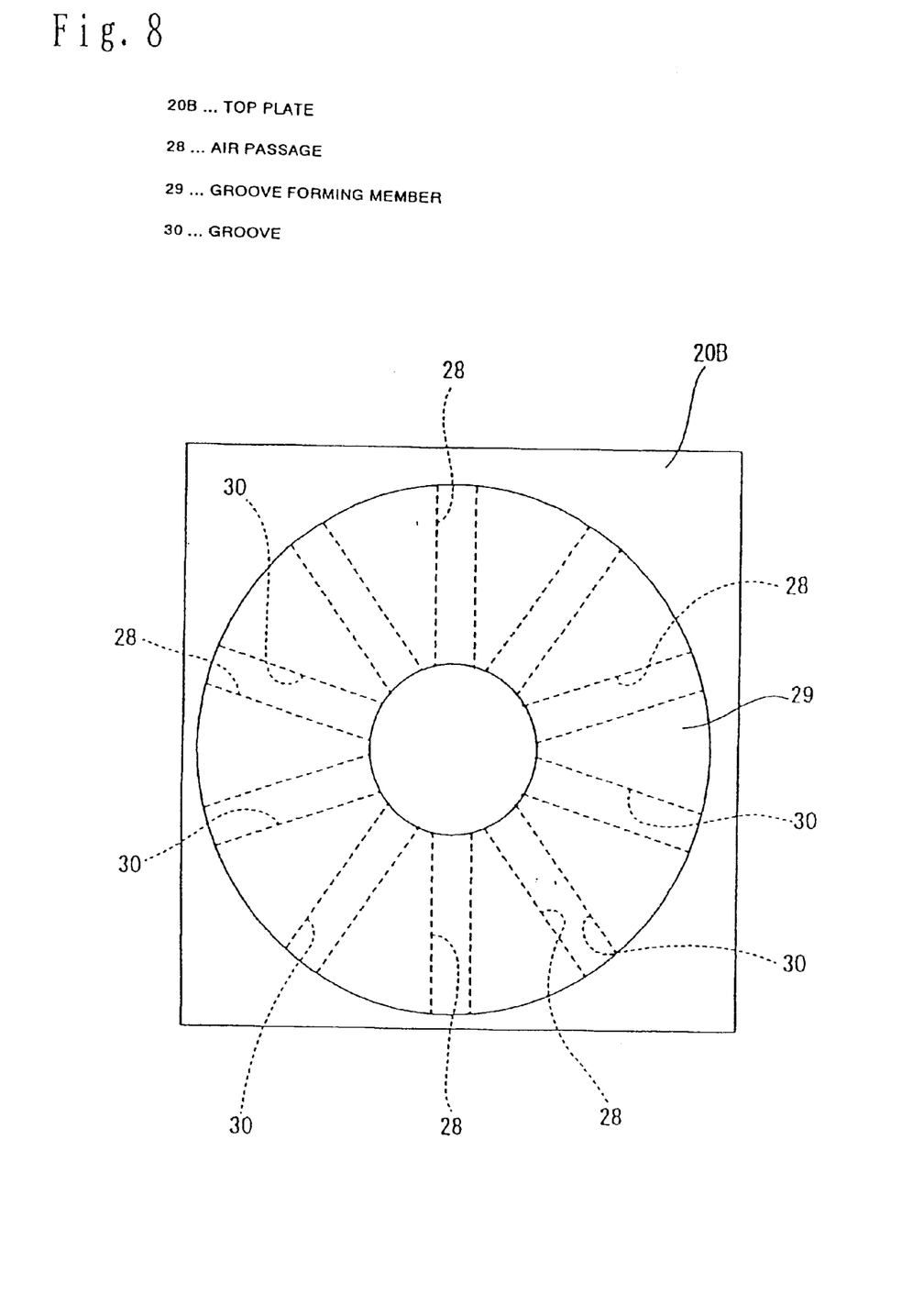
FIG. 8 is a bottom view of a top plate of the disc drive apparatus of FIG. 7.
Figure 9:
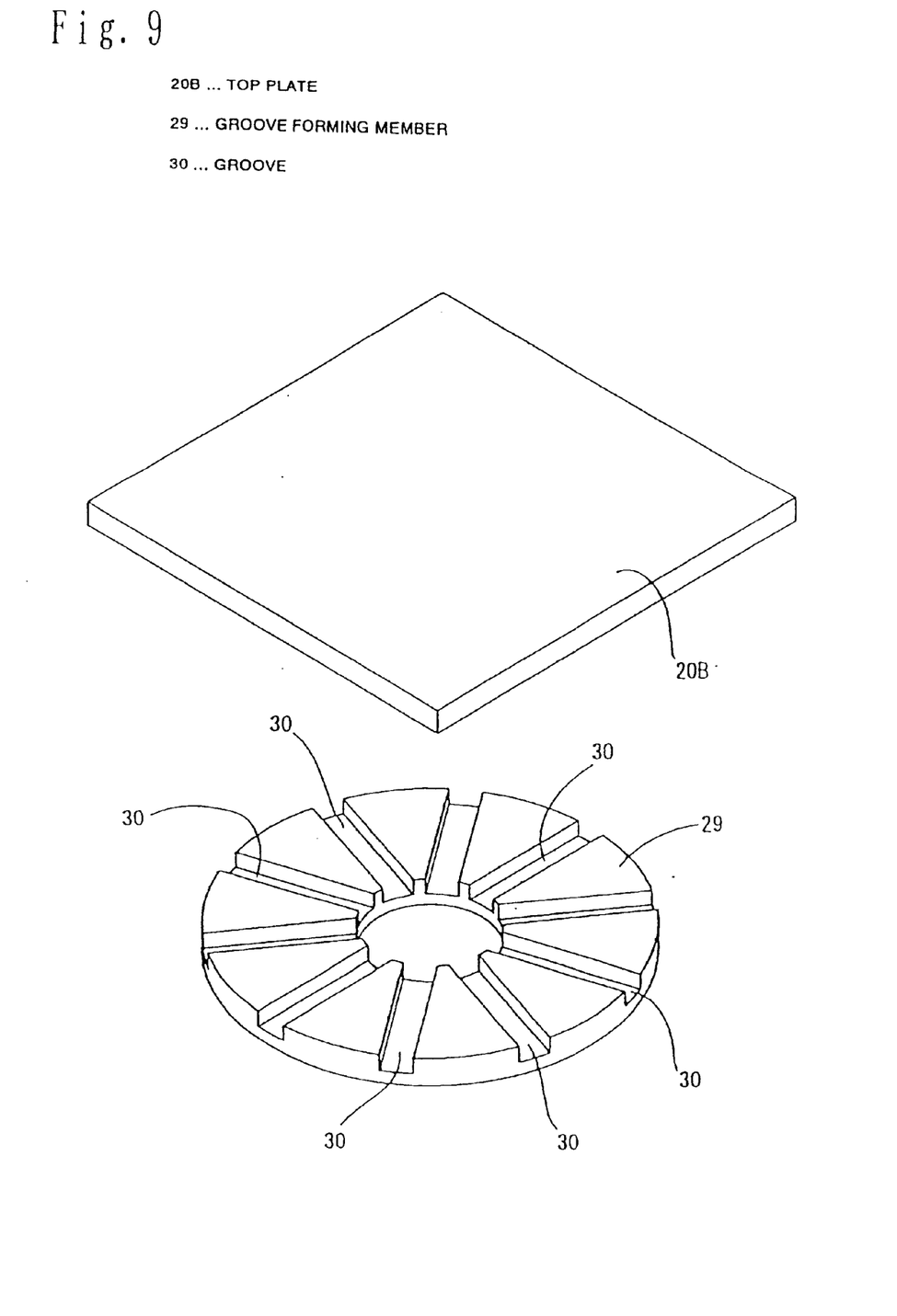
FIG. 9 is a perspective view in which the top plate and a groove forming member of the disc drive apparatus of FIG. 7 are separated.

FIGS. 7–9 show a disc drive apparatus according to a third embodiment of the invention. As shown in the disc drive apparatus 1B of FIGS. 7–9, the inside surface of the top plate 20B of a body 2B has a plurality of air passages 28 that extend in radial directions of a mounted disc-shaped recording medium 16 from the central portion of the disc-shaped recording medium 16 to an outer portion along its outside periphery. The inner openings 28a of the respective air passages 28 are open to the central portion of the disc-shaped recording medium 16 and the outer openings 28b are open to the outer portion along its outside periphery.

The above-described air passages 28 are formed in the manner shown in FIGS. 8–9 as follows.

The top surface of a doughnut-shaped groove forming member 29 is formed with a plurality of grooves 30 that extend from the inside circumferential surface to the outside circumferential surface. Then, the groove forming member 29 is fixed to the inside surface of the top plate 20B. As a result, the grooves 30 that are formed in the groove forming member 29 are covered to form the air passages 28, and the inner ends and the outer ends of the respective grooves 30 become the inner openings 28a and outer openings 28b, respectively.

Also in the disc drive apparatus 2B according to the third embodiment, as the disc-shaped recording medium 16 rotates, air flows over the disc-shaped recording medium 16 so as to circulate via the air passages 28, whereby the phenomenon that extremely high negative pressure occurs over the disc-shaped recording medium 16 is prevented.

The air passages 28 can be formed simply by securing the groove forming member 29 including the grooves 30 to the inside surface of the top plate 20B. As a result, the air passages 28 can be easily formed.

Figure 10:
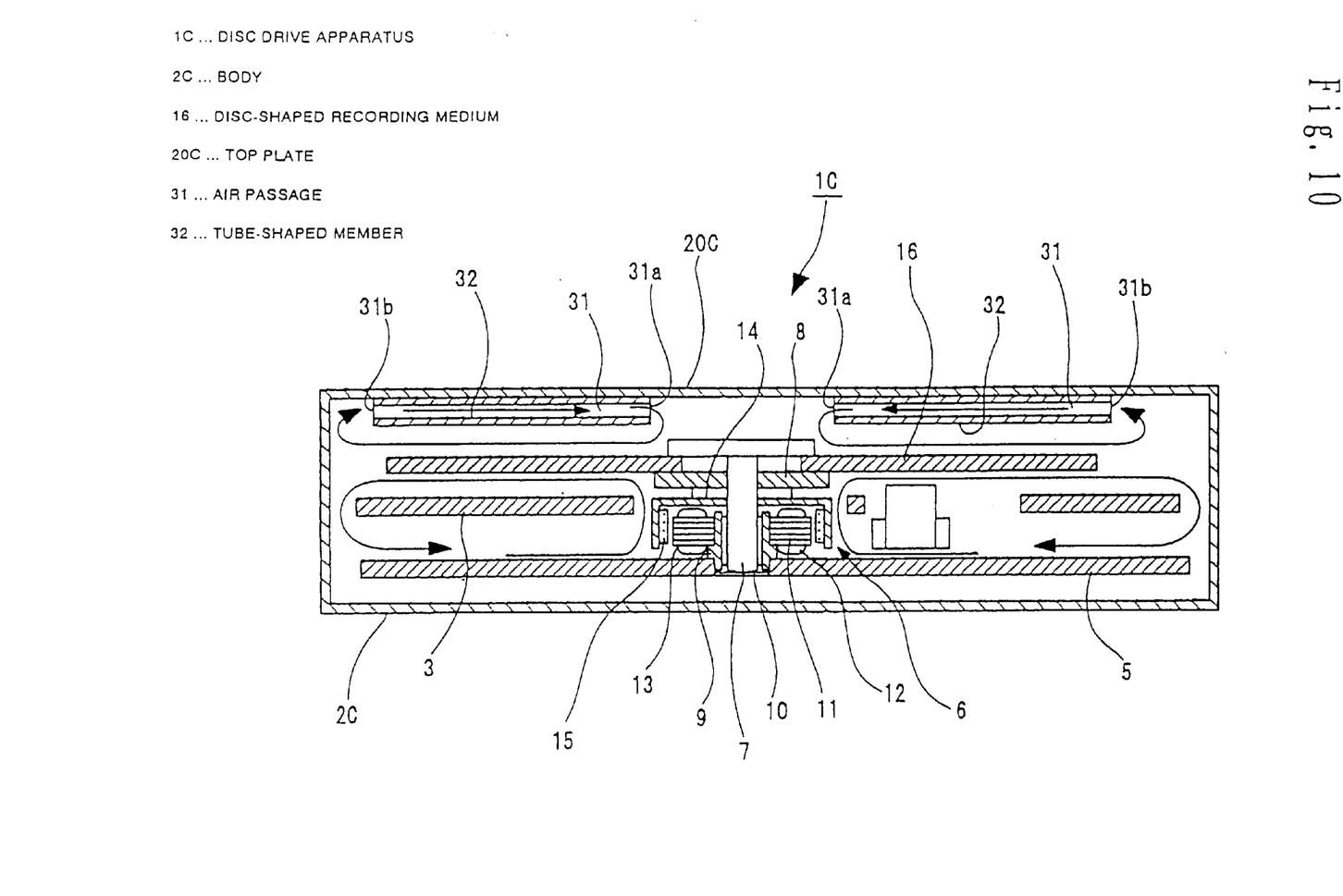
FIG. 10 is a vertical sectional view showing a fourth preferred embodiment of a disc drive apparatus in accordance with the teachings of the present invention.
Figure 11:
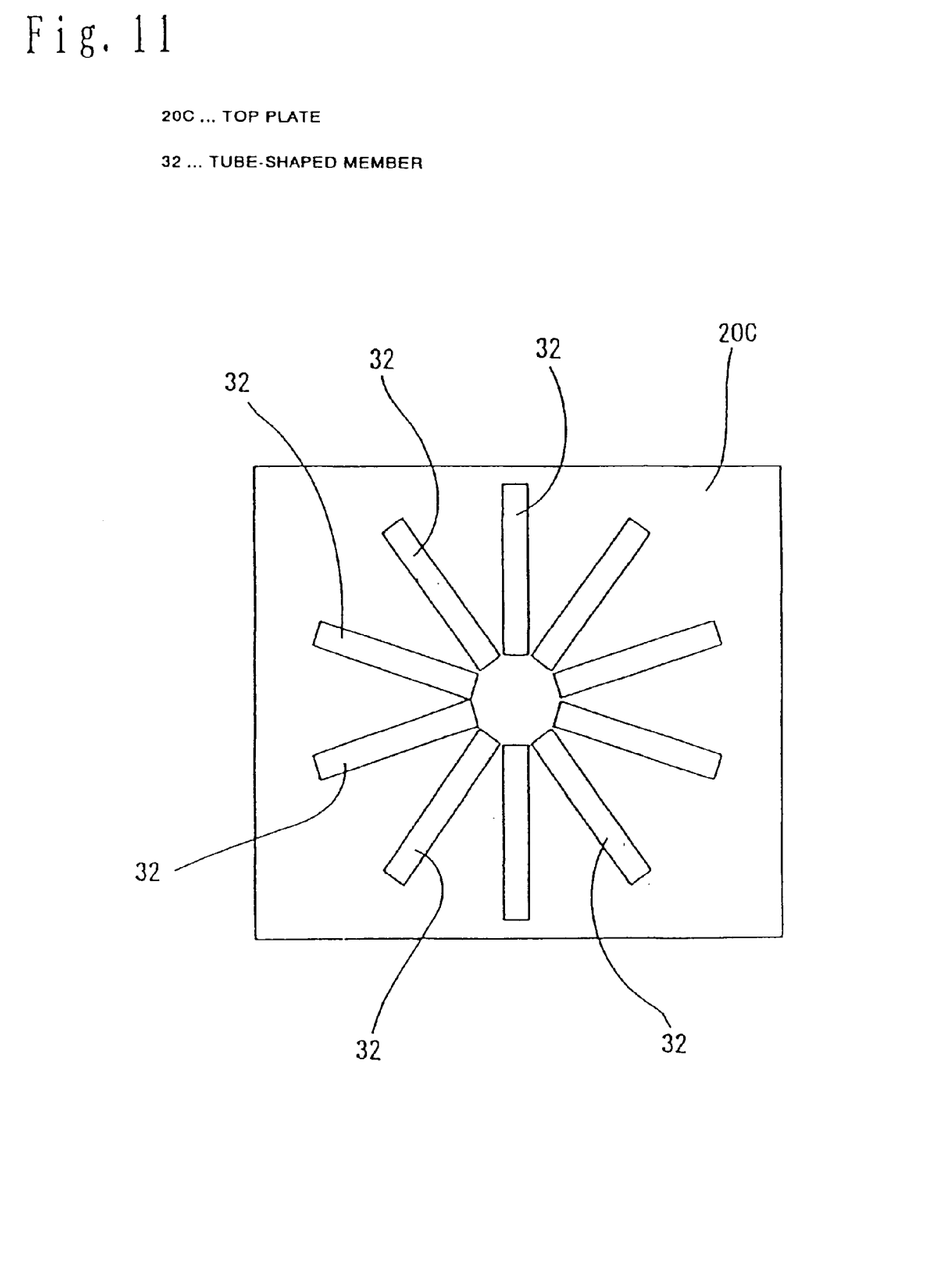
FIG. 11 is a bottom view of a top plate of the disc drive apparatus of FIG. 10.
Figure 12:
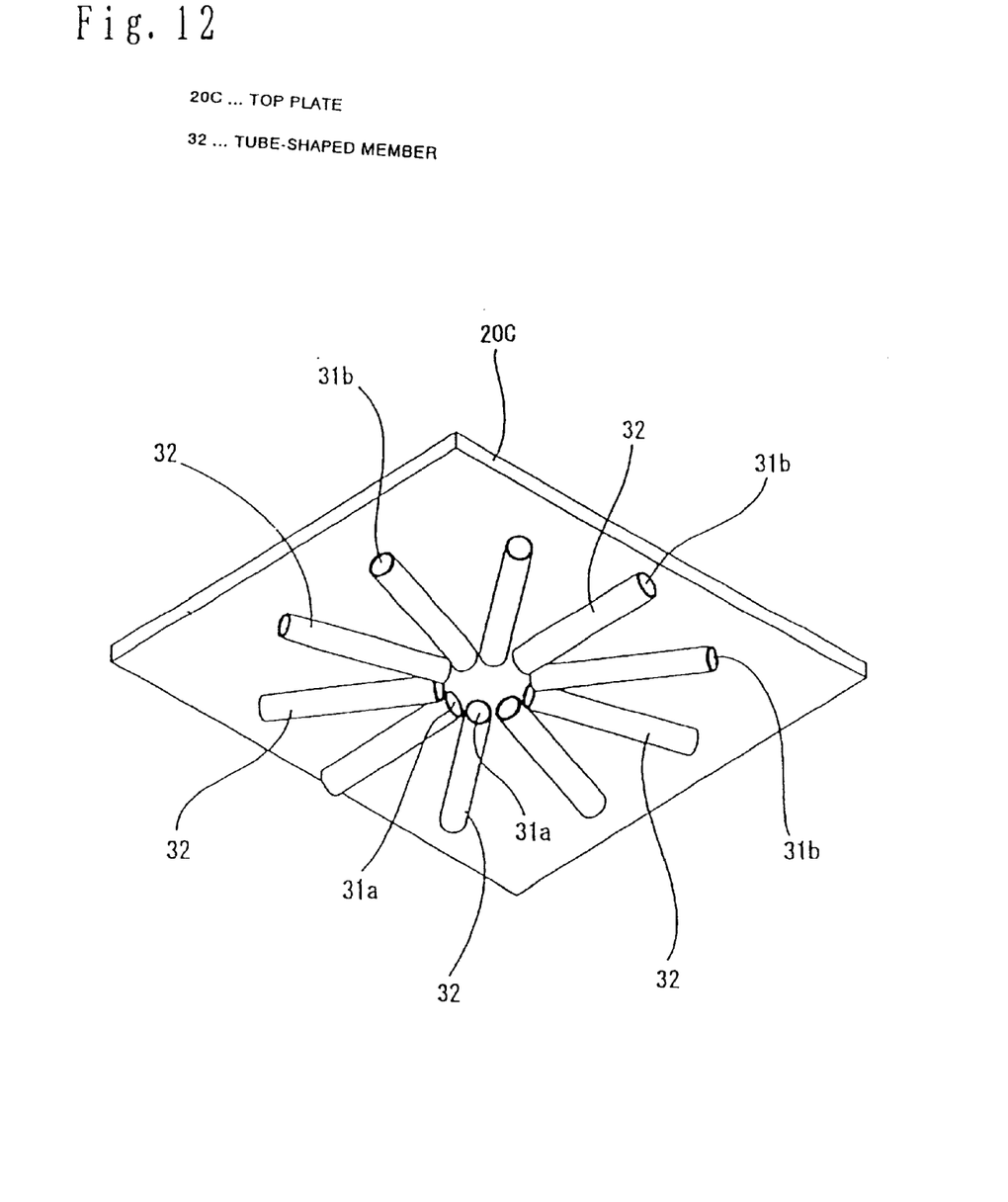
FIG. 12 is a perspective view in which the top plate of the disc drive apparatus of FIG. 10 is viewed from below.

FIGS. 10–12 show a disc drive apparatus according to a fourth embodiment of the invention. In the disc drive apparatus IC of FIGS. 10–12, the inside surface of the top plate 20C of a body 2C includes a plurality of air passages 31 that extend in radial directions of a mounted disc-shaped recording medium 16 from the central portion of the disc-shaped recording medium 16 to an outer portion along its outside periphery. The inner openings 31a of the respective air passages 31 are open on the side of the central portion of the disc-shaped recording medium 16 and the outer openings 31b are open on the side of the outer portion along its outside periphery.

The above-described air passages 31 are formed in the manner shown in FIGS. 11–12 as follows.

Here, a plurality of pipe-shaped members 32 extend from inside end positions corresponding to the central portion of the disc-shaped recording medium 16 to outside end positions corresponding to the outer portion which are secured to the inside surface of the top plate 20C. The inside spaces of the pipe-shaped members 32 form the air passages, 15 respectively, and the inner ends and the outer ends of the respective pipe-shaped members 32 form the inner openings 31a and outer openings 31b, respectively.

Also in the disc drive apparatus 2C according to the fourth embodiment, as the disc-shaped recording medium 16 rotates, air flows thereover so as to circulate via the air passages 31, whereby the phenomenon that extremely high negative pressure occurs over the disc-shaped recording medium 16 is prevented.

Figure 13:
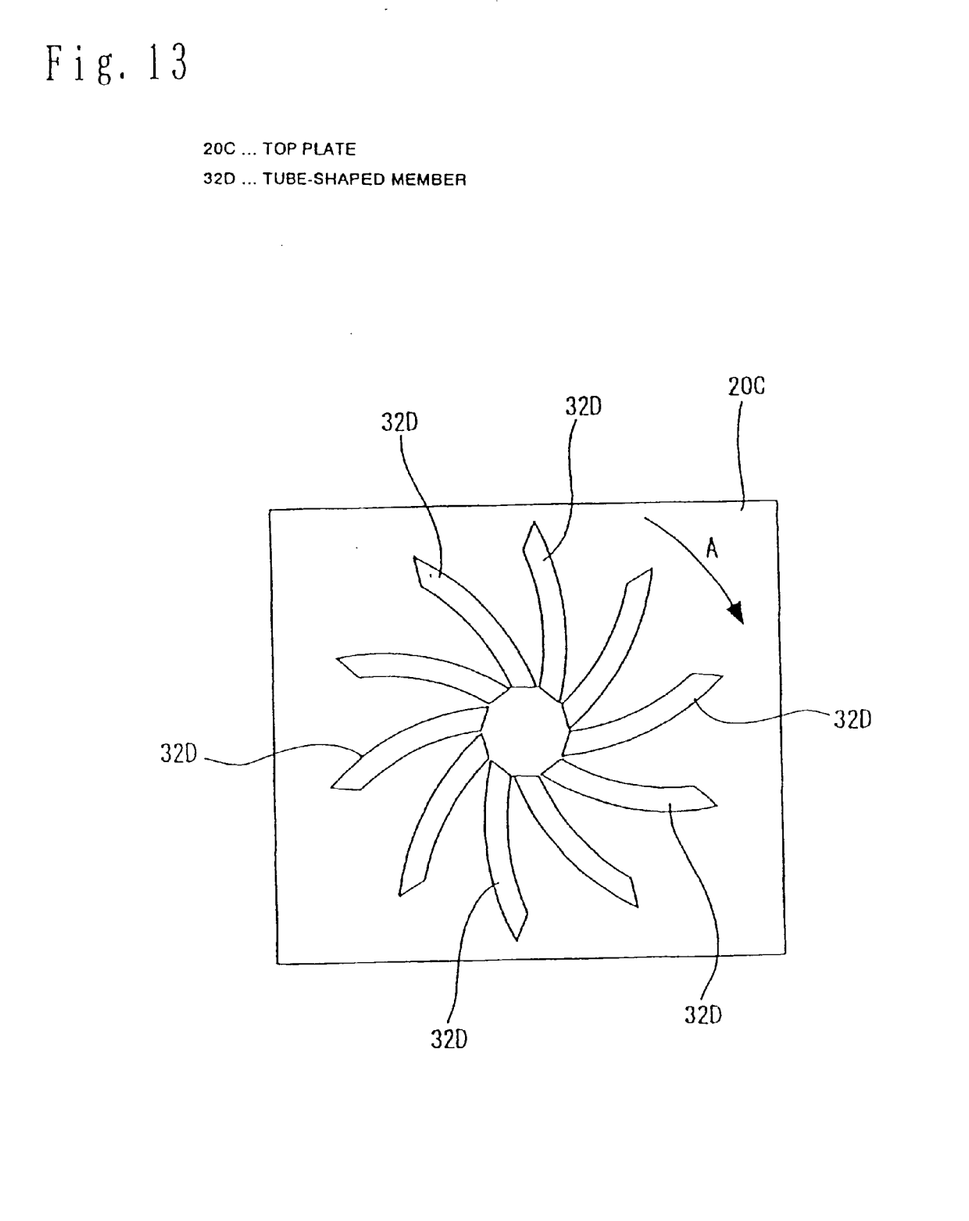
FIG. 13 is a bottom view of a top plate according to a modification of the fourth embodiment.

In the disc drive apparatus 1C according to the fourth embodiment, the pipe-shaped members 32 can be arranged arbitrarily, which creates a high degree of freedom in design. For example, by disposing the outer end portions of the respective pipe-shaped members 32 close to positions where the air pressure is highest in the body 2C, circulating air can be efficiently guided into the air passages 31. Further, an arrangement as shown in FIG. 13 is possible wherein curved pipe-shaped members 32D are convex in the rotation direction (indicated by arrow A in the figure) of the disc-shaped recording medium 16. The tip portions of the pipe-shaped members 32D are directed so as to receive air that flows in the rotation direction of the disc-shaped recording medium 16. This arrangement permits circulating air to be guided into the air passages more efficiently.

As is apparent from the above description, the invention provides a disc drive apparatus for performing recording and/or reproduction on a disc-shaped recording medium in which a top plate of a body is in close proximity to the disc-shaped recording medium. This top plate is provided with air passages that extend in radial directions of the disc-shaped recording medium.

Therefore, in the disc drive apparatus according to the invention, air that has passed from a central portion to a peripheral portion over the disc-shaped recording medium upon rotation of the disc-shaped recording medium returns to the central portion via the air passages of the top plate. Therefore, reduction in air pressure is prevented over the disc-shaped recording medium. As a result, flotation of the disc-shaped recording medium can be prevented without the need for using an expensive additional component such as a magnet or a ball bearing.

In this invention, the top plate is formed with punch-out portions that extend from inside end positions corresponding to a central portion of the disc-shaped recording medium to outside end positions corresponding to a peripheral portion of the disc-shaped recording medium; a sheet-like outer cover that entirely covers the punch-out portions is secured to a top surface of the top plate; a sheet-like inner cover that covers portions of the punch-out portions excluding inner end portions and outer end portions thereof is secured to the inside surface of the top plate; and the portions of the punch-out portions that are covered with the two covers form air passages. Therefore, the air passages can be easily formed.

Further, since the air passages can be formed approximately within the thickness of the top plate, the air passages can be formed without increasing the thickness of the disc drive apparatus.

In addition, the inside surface of the top plate is formed with grooves that extend from inside end positions corresponding to a central portion of the disc-shaped recording medium to outside end positions corresponding to a peripheral portion of the disc-shaped recording medium; a sheet-like cover that covers portions of the grooves excluding inner end portions and outer end portions thereof is secured to the inside surface of the top plate; and the grooves form air passages. Therefore, the air passages can be easily formed.

Further, since the grooves are formed in the top plate, the strength of the top plate can be increased.

Further, the top surface of a doughnut-shaped groove forming member is formed with grooves that extend from the inside circumferential surface to the outside circumferential surface; the groove forming member is fixed to the inside surface of the top plate; and the grooves are covered with the top plate to form air passages. Since the air passages can be formed simply by fixing the groove forming member that is formed with the grooves to the top plate with the grooves located on the top plate side, the air passages can be easily formed.

In yet another advantageous feature, tube-shaped members that extend from inside end positions corresponding to a central portion of the disc-shaped recording medium to outside end positions corresponding to a peripheral portion of the disc-shaped recording medium are secured to the inside surface of the top plate; and the inside spaces of the tube shaped members form air passages. Since the tube-shaped members can be arranged arbitrarily, a high degree of freedom in design results. For example, circulating air can efficiently be guided into the air passages by disposing the outer end portions of the respective tube-shaped members close to positions where the air pressure is highest in the body.

Although certain preferred embodiments of the invention have been described in detail with reference to the accompanying drawings it is to be understood that the present invention is not limited to those precise embodiments, and that many changes and modifications could be effected therein by one skilled in the art without departing from the spirit and scope of the invention as defined in the appended claims. For instance, all of the and structures of the respective components shown in each embodiment are just examples of implementation in practicing the invention, and the technical scope of the invention should not be construed in a limitive manner by those shapes and structures.

What is claimed is:

1. A disc drive apparatus for performing recording and/or reproduction from a disc-shaped recording medium, said disc drive apparatus comprising:

drive means for rotating the disc-shaped recording medium, which is placed at one side of the disc-shaped recording medium, a body for accommodating the drive means, in which a top plate of a body is at the other side of and in close proximity to the disc-shaped recording medium, and wherein the top plate is provided with air passages formed therein that extend in radial directions from the disc-shaped recording medium, and wherein the top plate is formed with punch-out portions that extend from inside end positions corresponding to a central portion of the disc-shaped recording medium to outside end positions corresponding to a peripheral portion of the disc-shaped recording medium;

a sheet-like outer cover that entirely covers the punch-out portions and is fixed to a top surface of the top plate;

a sheet-like inner cover that covers portions of the punch-out portions excluding inner end portions and outer end portions thereof and is fixed to an inside surface of the top plate; and portions of the punch-out portions that are covered with two covers form said air passages.

2. A disc drive apparatus for performing recording and/or reproduction from a disc-shaped recording medium, said disc drive apparatus comprising:

drive means for rotating the disc-shaped recording medium, which is placed at one side of the disc-shaped recording medium, a body for accommodating the drive means, in which a top plate of a body is at the other side of and in close proximity to the disc-shaped recording medium, and wherein the top plate is provided with air passages formed therein that extend in radial directions from the disc-shaped recording medium; and wherein an inside surface of the top plate is formed with grooves that extend from inside end positions corresponding to a central portion of the disc-shaped recording medium to outside end positions corresponding to a peripheral portion of the disc-shaped recording medium;

a sheet-like cover that covers portions of the grooves excluding inner end portions and outer end portions thereof and is fixed to the inside surface of the top plate; and the grooves form said air passages.

3. A disc drive apparatus for performing recording and/or reproduction from a disc-shaped recording medium, said disc drive apparatus comprising:

drive means for rotating the disc-shaped recording medium, which is placed at one side of the disc-shaped recording medium, a body for accommodating the drive means, in which a top plate of a body is at the other side of and in close proximity to the disc-shaped recording medium; and wherein the top plate is provided with air passages formed therein that extend in radial directions from the disc-shaped recording medium; and wherein a top surface of a generally doughnut-shaped groove forming member is formed with grooves that extend from an inside circumferential surface to an outside circumferential surface;

the groove forming member is fixed to an inside surface of the top plate; and the grooves that are covered with the top plate from said air passages.

4. A disc drive apparatus for performing recording and/or reproduction from a disc-shaped recording medium, said disc drive apparatus comprising:

drive means for rotating the disc-shaped recording medium, which is placed at one side of the disc-shaped recording medium, a body for accommodating the drive means, in which a top plate of a body is at the other side of and in close proximity to the disc-shaped recording medium; and wherein the top plate is provided with air passages formed therein that extend in radial directions from the disc-shaped recording medium; and wherein tube-shaped members that extend from inside end positions corresponding to a central portion of the disc-shaped recording medium to outside end positions corresponding to a peripheral portion of the disc-shaped recording medium are fixed to an inside surface of the top plate; and inside spaces of the tube-shaped member form said air passages.

5. A disc drive apparatus for performing recording on and/or reproduction from a disc-shaped recording medium, said disc drive apparatus comprising:

drive means for rotating the disc-shaped recording medium, which is placed at one side of the disc-shaped recording medium, a body for accommodating the drive means, in which a top plate of the body is at the other side of and in close proximity to the disc-shaped recording medium, said top plate is formed with punch-out portions that extend from inside end positions corresponding to a central portion of the disc-shaped recording medium to outside end portions corresponding to a peripheral portion of the disc-shaped recording medium; said body further including a sheet-like outer cover that entirely covers the punch-out portions and is fixed to a top surface of the top plate and a sheet-like inner cover that covers portions of the punch-out portions excluding inner end portions and outer end portions thereof and is fixed to an inside surface of the top plate, and wherein the top plate is provided with air passages that extend in radial directions from the disc-shaped recording medium and portions of the punch-out portions that are covered with the two covers form said air passages.

6. A disc drive apparatus for performing recording on and/or reproduction from a disc-shaped recording medium, said disc drive apparatus comprising:

drive means for rotating the disc-shaped recording medium, which is placed at one side of the disc-shaped recording medium, a body for accommodating the drive means, in which a top plate of the body is at the other side of and in close proximity to the disc-shaped recording medium, an inside surface of the top plate is formed with grooves that extend from inside end positions corresponding to a central portion of the disc-shaped recording medium to outside end portions corresponding to a peripheral portion of the disc-shaped recording medium, a sheet-like cover that covers portions of the grooves excluding inner end portions and outer end portions thereof and is fixed to the inside surface of the top plate, and wherein the top plate is provided with air passages that extend in radial directions from the disc-shaped recording medium and the grooves from said air passages.

7. A disc drive apparatus for performing recording on and/or reproduction from a disc-shaped recording medium, said disc drive apparatus comprising:

drive means for rotating the disc-shaped recording medium, which is placed at one side of the disc-shaped recording medium, a body for accommodating the drive means, in which a top plate of the body is at the outer side of and in close proximity to the disc-shaped recording medium, and wherein the top plate is provided with air passages that extend in radial directions from the disc-shaped recording medium;

a top surface of a generally doughnut-shaped groove forming member is formed with grooves that extend from an inside circumferential surface to an outer circumferential surface, the groove forming member is fixed to an inside surface of the top plate; and the grooves that are covered with the top plate form said air passages.

8. A disc drive apparatus for performing recording on and/or reproduction from a disc-shaped recording medium, said disc drive apparatus comprising:

drive means for rotating the disc-shaped recording medium, which is placed at one side of the disc-shaped recording medium, body for accommodating the drive means, in which a top plate of the body is at the other side of an in close proximity to the disc-shaped recording medium; and wherein the top plate is provided with air passages that extend in radial directions from the disc-shaped recording medium; and tube-shaped members that extend from inside end positions corresponding to a central portion of the disc-shaped recording medium to outside end positions corresponding to a peripheral portion of the disc-shaped recording medium are fixed to an inside surface of the top plate, and inside spaces of the tube-shaped members form said air passages.

* * * * *